United States Patent [19]

Zelahy

[11] 3,820,961

[45] June 28, 1974

[54] NICKEL BASE DIFFUSION BONDED ARTICLE

[75] Inventor: John W. Zelahy, Cincinnati, Ohio

[73] Assignee: General Electric Company, Cincinnati, Ohio

[22] Filed: Mar. 16, 1973

[21] Appl. No.: 341,882

Related U.S. Application Data

[62] Division of Ser. No. 186,490, Oct. 4, 1971, Pat. No. 3,759,692.

[52] U.S. Cl.................................. 29/194, 75/171
[51] Int. Cl........................................... B23k 31/02
[58] Field of Search............ 75/15 AA, 15 BA, 171; 29/194

[56] References Cited
UNITED STATES PATENTS

| | | | |
|---|---|---|---|
| 2,714,760 | 8/1955 | Boam et al....................... | 29/498 X |
| 3,303,024 | 2/1967 | Cape..................... | 75/171 |
| 3,632,319 | 1/1972 | Hoppin et al..................... | 29/504 X |
| 3,692,501 | 9/1972 | Hoppin........................... | 29/194 X |
| 3,700,427 | 10/1972 | Hoppin et al..................... | 75/171 X |

Primary Examiner—L. Dewayne Rutledge
Assistant Examiner—Arthur J. Steiner
Attorney, Agent, or Firm—Lee H. Sachs; Derek P. Lawrence

[57] ABSTRACT

A nickel base, boron including bonding powder for use in bonding alloy members is provided with improved toughness and ductility through the elimination of the boride former and precipitation strengthener titanium and the boride formers and solution strengtheners molybdenum and tungsten, which for some applications have been included in age hardeneable bonding powders. Further melting point reduction can be obtained through the addition of elements selected from tantalum and hafnium in the sum of 2 – 4 weight percent. An unique joint produced in an article between alloy members using such bonding powder is characterizied by a recrystallized, non-planar microstructure including predominantly discrete, dispersed borides rather than a continuous planar boride phase.

3 Claims, No Drawings

NICKEL BASE DIFFUSION BONDED ARTICLE

This is a divisional application of application Ser. No. 186,490 filed Oct. 4, 1971, now U.S. Pat. No. 3,759,692, and assigned to the assignee of the present invention.

BACKGROUND OF THE INVENTION

Recent advances in that technology relating to solid state pressure diffusion bonding include the development of vacuum hot press furnace apparatus capable of developing high vacuum as well as high temperature and pressure around components of an article to be joined by solid state diffusion bonding. The combination of such technology with that relating to brazing employing a bonding alloy led to an invention described in co-pending application Ser. No. 841,093, filed July 11, 1969, now U.S. Pat. No. 3,632,319, and assigned to the assignee of the present invention. Such invention, one form of which is sometimes referred to as activated diffusion bonding, provides an improved diffusion bonded joint between alloy members through the use of a bonding powder the composition of which is matched with that of the alloy members being joined and which includes certain melting point depressants selected from B, Si, Mn, Cb, Ta and their mixtures. Only relatively slight aligning pressures are required between members to be joined to effect a sound bond under relatively high vacuum conditions.

It has been recognized through microprobe analysis, that certain activated diffusion bonded joints in nickel base alloys retain certain melting point depressants combined with Mo, W and Ti resulting in brittle, continuous phases and hence lower joint ductilities.

SUMMARY OF THE INVENTION

It is a principal object of the present invention to provide a nickel base bonding powder of improved toughness and ductility through the elimination of those elements which tend to combine with melting point depressants in the bonding alloy to generate in the joint area phases which tend to embrittle the joint.

Another object is to provide such a bonding powder including melting point depressants which have a tendency to migrate into the parent metal, in order to combine with such eliminated elements, leaving the joint region relatively free of brittle phases.

Still another object is to provide between bonded members a joint having an unique microstructure which provides the joint with improved fracture toughness and ductility.

These and other objects and advantages will be more clearly understood from the following detailed description and the examples all of which are meant to be typical of rather than limiting on the scope of the present invention.

Briefly, the present invention provides a nickel base bonding powder consisting essentially of a matrix of Ni, Cr and Co, for example, 8 – 30 percent of elements selected from Cr and Co with the balance Ni and incidental impurities, along with 1.5–2.4% B, 2–5% Al, up to about 0.2% C, and up to about 4 percent of elements selected from Ta and Hf. A preferred form of the bonding powder consists essentially of, by weight, 14 – 17% Cr, 8–12% Co, 2–5% Al, 1.5–2.4% B, 2–4% (Hf + Ta), up to about 0.2% C, with the balance Ni and incidental impurities.

An improved joint provided in a diffusion bonded article through use of such bonding powder has improved toughness and ductility from a recrystallized, non-planar microstructure which includes primarily discrete, dispersed borides in lieu of a continuous, planar boride phase frequently found in joints made with currently used bonding alloys.

DESCRIPTION OF THE PREFERRED EMBODIMENTS

Metallographic and chemical examination of activated diffusion bonded joints of certain nickel base superalloys of the type precipitation strengthened primarily through the elements Al and Ti and solution strengthened primarily through the elements W and Mo, disclose the presence of embrittling phases. These are believed to be primarily as a result of the introduction of melting point depressants, such as Si or B or both in an age hardenable bonding powder including all of such precipitation and solution strengthening elements.

It has been found, according to the present invention, that improved joint toughness and ductility can be provided in such activated diffusion bonded joints through the provision of a Ni—Cr base bonding powder which does not include the elements Mo, W and Ti but includes B as a melting point depressant. The addition of other melting point depressants selected from Hf and Ta further improves melting characteristics as well as fragmenting and recrystallizing the joint area. More specifically, elimination of Mo and W appreciably improves impact resistance whereas elimination of Ti was beneficial from the standpoint of producing a non-planar crack propagation resistant joint.

During detailed evaluation of the present invention, a variety of bonding alloys were prepared by argon arc melting repeatedly to provide homogeneity, after which they were crushed in a forge hammer. Flow panel tests were conducted in vacuum to determine the liquidus and solidus temperatures along with flow characteristics and cleanliness. Selected for use as a parent metal in members to be joined in the evaluation of the present invention was a nickel base alloy, sometimes referred to as Rene 80 alloy, and consisting nominally of, by weight, 0.17% C, 14% Cr, 5% Ti, 0.015% B, 3% Al, 4% W, 4% Mo, 9.5% Co, 0.06% Zr, with the balance essentially nickel and incidental impurities.

Of particular interest in connection with the evaluation of the present invention are the alloys the compositions for which are shown in Table I and prepared as described above.

TABLE I

| Alloy | Wt. %, Bal. Ni and incidental impurities | | | | | | | | |
|---|---|---|---|---|---|---|---|---|---|
| | Cr | Co | Al | B | Mo | W | Ti | Ta | Hf |
| A | 14.0 | 9.5 | 3.0 | 2.1 | 4.0 | 4.0 | 4.9 | | |
| 1 | 15.0 | 10.7 | 3.4 | 2.0 | | | | | |
| 2 | 15.2 | 10.1 | 4.0 | 1.9 | | | | | 2.5 |
| 3 | 15.4 | 10.2 | 3.4 | 2.3 | | | | 3.2 | |
| 4 | 15.7 | 10.5 | 3.7 | 2.4 | | | | | 2.9 |

These specimens were made up of pairs of ⅜ inch diameter × 1 inch long bars positioned end to end with the bonding alloy placed in the joint as a 0.010 inch thick, 50 percent dense preform of bonding alloy and acrylic binder. The bars were then arranged vertically in groups of three and a dead weight load was applied. The specimens were then brazed under the various conditions described in connection with the specific examples in the following Table II. Impact testing was conducted at room temperature on un-notched, 0.300 inch diameter × 2 inches long bars using a pendulum impact tester. The specimens were supported at the ends with the impacter striking at the bonded joint.

TABLE II

Impact Data at Room Temp.

| Conditions Alloy | Joint Bonding | | | Avg. Impact (Ft. - Lbs.) |
|---|---|---|---|---|
| | (°F) | (hrs) | (psi) | |
| Parent | | | | 14 |
| A | 2225 | ½ | 45 | 3 |
| 1 | 2250 | 2 | 45 | 10 |
| 2 | 2250 | 2 | 45 | 11 |
| | 2200 | 2 | 15 | 17 |
| | 2200 | 2 | 10 | 15(a) |
| | 2200 | ½ | 45 | 10 |
| | 2175 | 2 | 45 | 15(b) |
| | 2150 | 2 | 45 | 14(b) |
| 3 | 2225 | 2 | 45 | 7 |
| | 2200 | 2 | 45 | 17(a) |
| | 2200 | 2 | 10 | 13(a) |
| | 2200 | ½ | 45 | 10 |
| | 2200 | ½ | 10 | 11 |
| | 2175 | 2 | 45 | 15(b) |
| | 2150 | 2 | 45 | 14(b) |

(a) half of specimens tested failed in parent metal
(b) all of specimens tested failed in parent metal The data of Table II shows that the joint bonded with the bonding powder of the present invention, which eliminates the presence of Mo, W and Ti, results in a joint having an average impact strength which not only can equal but can exceed the parent metal impact strength. As shown by that data, the specimens bonded at temperatures of about 2200°F or below, for times in excess of ½ hour, are specifically preferred in that they equal and generally exceed the parent metal impact strength. It should be noted that failure of specimens bonded below about 2200°F resulted in every case in failure in the parent metal rather than in the joint area. Thus, with the proper selection of processing conditions, the bonding powder of the present invention can provide tough and ductile joints between superalloy members.

Joint microstructures correlated well with the impact results. Joints having high impact strength exhibited a recrystallized zone with dispersed borides whereas the weaker joints exhibited larger, more continuous borides. Joints made at the higher pressures and for longer times, produced joints with less porosity and fewer borides.

The elimination of the boride formers Mo, W and Ti from the bonding powder results in a joint average impact strength of more than three times that produced using known materials. However, through the inclusion of elements selected from Ta and Hf, still further and significantly greater improvement in joint impact strength can be obtained to exceed the impact strength of the parent metal surrounding the joint. Thus, a preferred form of the present invention not only eliminates Mo, W and Ti from the bonding powder composition, but specifically includes elements selected from Hf and Ta.

Of the elements included in the improved bonding alloy of the present invention, it has been recognized that amounts of B and of the elements of the group Ta and Hf are more critical. In respect to B, less than about 1.5 percent results in too high a liquidus temperature and poor flow characteristics. Greater than about 2.4 percent B results in the formation of excess borides and too much liquid. In respect to the elements Ta and Hf in the specifically preferred form of the present invention, less than about 2 percent does not help recrystallization of the joint and is not significantly effective in reducing the liquidus temperature; greater than about 4 percent shows no additional benefit to the alloy and adds to its cost.

In respect to C, the inclusion of up to about 0.2 weight percent appears to have no appreciable effect on the alloy. However, greater than about 0.2 percent tends to raise the melting temperature.

Of the other elements included in the bonding powder of the present invention, the more significant is Cr in its preferred upper range of about 17 percent. Above that amount, there may in some alloys be a tendency to form the embrittling sigma phase which is undesirable.

As will be recognized by those skilled in the art of metal joining, there are various modifications which can be made within the scope of the present invention, some examples of which have been specifically presented.

What is claimed is:

1. An article including an improved diffusion bonded joint portion between a plurality of nickel base superalloy members, the joint portion:
   consisting essentially of, by weight, 1.5–2.4% B, 2–5% Al, up to about 4 percent of elements selected from the group consisting of Ta and Hf the sum of such elements when selected being 2 – 4 percent, up to about 0.2% C, with the balance Cr, Co, Ni and incidental impurities; and
   characterized by a recrystallized, non-planar microstructure including predominantly discrete, dispersed borides.

2. The article of claim 1 in which the joint portion consists essentially of, by weight:
   1.5 – 2.4% B;
   2–5% Al;
   2 – 4 percent of elements selected from the group consisting of Ta and Hf;
   Cr and Co in the sum of 8 – 30 percent;
   up to about 0.2% C;
   with the balance Ni and incidental impurities.

3. The article of claim 2 in which the Cr is 14 – 17 percent and the Co is 8 – 12 percent.

* * * * *